(12) United States Patent
Nakamoto (10) Patent No.: US 6,182,190 B1
(45) Date of Patent: Jan. 30, 2001

(54) AUTOMOBILE CONTROLLER (75) Inventor: Katsuya Nakamoto, Tokyo (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 09/204,192

(22) Filed: Dec. 4, 1998

(30) Foreign Application Priority Data

Jun. 15, 1998 (JP) ................................................. 10-167111

(51) Int. Cl.[7] .................................................... G06F 12/00
(52) U.S. Cl. ................. 711/103; 365/185.24; 365/185.33
(58) Field of Search ....................... 711/103; 365/185.24, 365/185.33

(56) References Cited

U.S. PATENT DOCUMENTS 5,581,503 * 12/1996 Matsubara et al. ............. 365/185.33
5,687,345 * 11/1997 Matsubara et al. .................. 711/103
5,844,843 * 12/1998 Matsubara et al. ............. 365/185.24

FOREIGN PATENT DOCUMENTS 8-203288    8/1996  (JP) .

* cited by examiner

Primary Examiner—Do Hyun Yoo
Assistant Examiner—Nasser Moazzami
(74) Attorney, Agent, or Firm—Sughrue, Mion, Zinn, Macpeak & Seas, PLLC (57) ABSTRACT To make it possible to rewrite a control program and decrease man-hours for change of the control program without removing a microcomputer or ROM when an automobile controller must change the control program due to any reason.

The following are used: a microcomputer 3 for accessing an electrically erasable nonvolatile memory 3-1 storing a control program, an external unit 2 storing a rewriting program 2-1 and a rewriting voltage source 2-2 for generating a rewriting voltage in accordance with the rewriting program 2-1, and a logic circuit 7A for generating a signal for setting the mode-setting related terminal of the microcomputer 3 to the rewriting mode in accordance with a writing voltage 1b generated by the external unit 2.

4 Claims, 6 Drawing Sheets

AUTOMOBILE CONTROLLER

BACKGROUND OF THE INVENTION

1. Field of the Invention

The present invention relates to an automobile controller for engine control or transmission control for arithmetic-processing a controlled variable in accordance with a control program, particularly to a microcomputer-mounted automobile controller making a memory storing a control program erasable while the memory is set to the controller.

2. Description of Related Art

An automobile controller is exposed to severe conditions such as temperature change and vibration. Particularly, for engine control, a socket cannot be used to set a microcomputer storing a control program or a ROM (Read Only Memory) because of improving the vibration resistance. Therefore, a program is written in a ROM (Read Only Memory) by an exclusive unit before a controller is assembled and directly soldered to a substrate.

BRIEF SUMMARY OF THE INVENTION

Object of the Invention

In the case of a conventional controller, a microcomputer or ROM must be directly soldered to a substrate because of the above reason. In this case, the following problem occurs.

In the case of an engine controller, control programs must be changed sometimes due to mismatch of control data due to the difference between engines under mass production. In this case, the prior art requires temporarily removing a microcomputer or ROM from a substrate to rewrite a control program and thereafter, soldering the microcomputer or ROM to the substrate again. Therefore, there are problems that a lot of man-hours are required and the reliability of a soldered portion is deteriorated.

Moreover, when a device storing a control program cannot be erased or rewritten, it is necessary to disuse the device removed from a substrate and replace the device with a new one. Therefore, there is a problem that the cost increases.

To solve these problems, the official gazette of Japanese Patent Laid-Open No. 8-203288 discloses a controller using an EEPROM (Electrically Erasable Programmable Read Only Memory) which is one of electrically erasable nonvolatile memories and built in a microcomputer to replace the contents of the nonvolatile memory with a new program while the memory is set to a printed circuit board.

Figure 6:
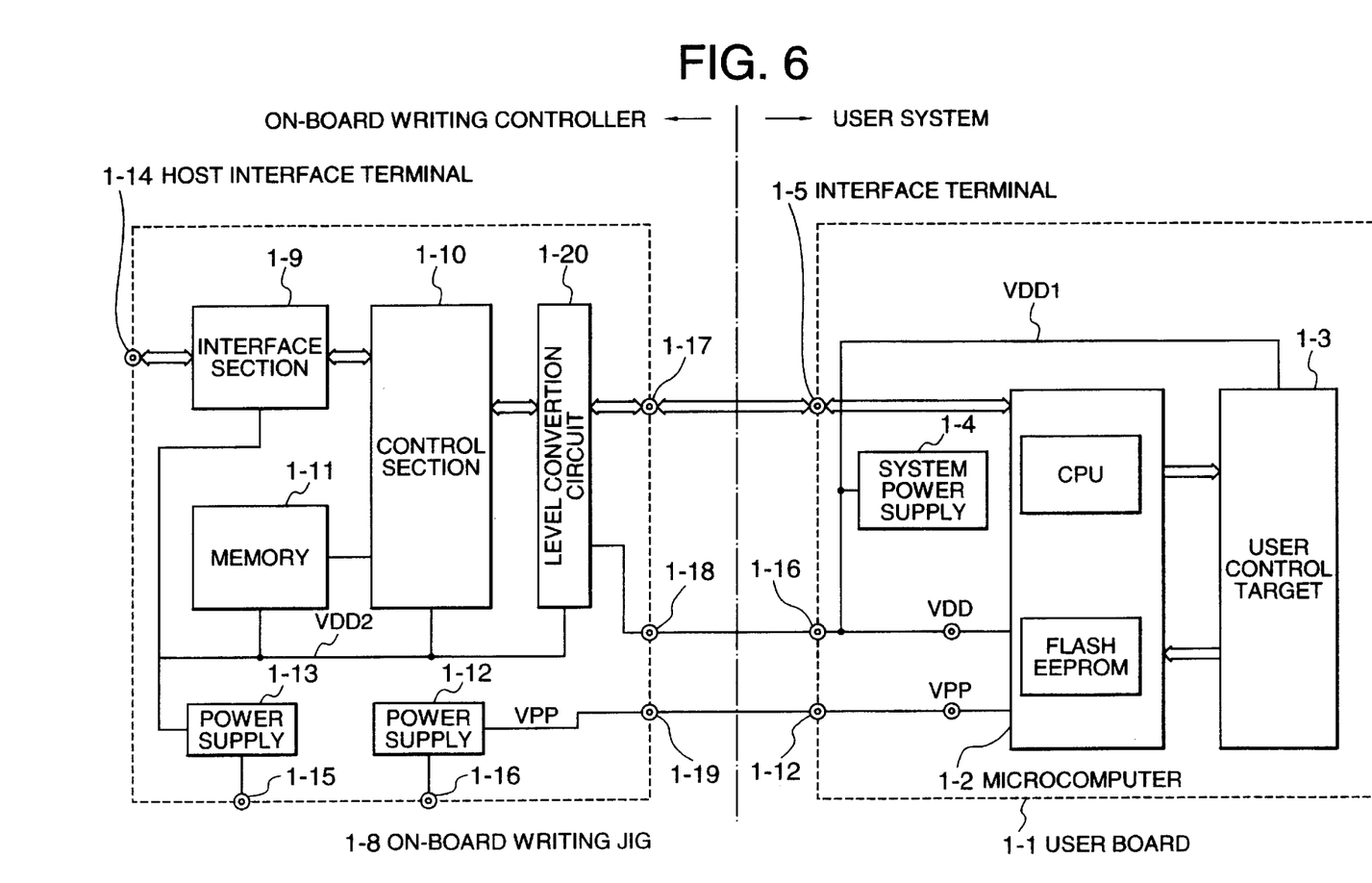
FIG. 6 is a conventional controller extracted from FIG. 1 in Japanese Patent Laid-Open No. 8-203288.

FIG. 6 is a block diagram of the invention disclosed in the official gazette of Japanese Patent Laid-Open No. 8-203288. To set a microcomputer (1-2) to the rewriting mode, it is necessary to supply a VPP power supply (1-12) serving as a rewriting power supply and a plurality of interface terminals (1-5) serving as mode-setting related terminals to a user board (1-1) serving as a controller from a writing jig (1-8) serving as an external unit.

Moreover, the block diagram exclusively requires a power supply output terminal (1-18) for protecting a microcomputer. Therefore, a harness and many connector terminals for connecting the user board (1-1) with the writing jig (1-8) are required. Thus, problems occur that a harness is complicated, the number of connector terminals increases, and a board increases in size and weight.

Therefore, to apply an EEPROM to an automobile controller, because the EEPROM is used for a plurality of controllers (for engine control, transmission control, and brake control), a harness is further complicated, fuel consumption and exhaust gas are increased due to increase in weight, the cost is increased, and the automobile controller cannot be mounted on an automobile due to restriction of space in the worst case.

The present invention is made to solve the above problems and its object is to provide an automobile controller capable of setting a microcomputer to the rewriting mode by supplying only a rewriting power supply.

Summary of the Invention

The automobile controller of the invention of claim 1 comprises a microcomputer for performing control processing by accessing an electrically erasable nonvolatile memory storing a control program and rewriting-signal generation means for generating a signal for setting the mode-setting related terminal of the microcomputer to the rewriting mode in accordance with a rewriting program of a built-in nonvolatile memory.

In the case of the automobile controller of the invention of claim 2, rewriting-signal generation means comprises an external unit storing a rewriting program and a rewriting voltage source for generating a rewriting voltage in accordance with the rewriting program and a logic circuit for generating a signal for setting the mode-setting related terminal of a microcomputer to the rewriting mode in accordance with the rewriting voltage generated by the external unit.

In the case of the automobile controller of the invention of claim 3, the input circuit of a rewriting voltage source is provided with voltage confirmation means for confirming the power supply voltage of a microcomputer with an external unit.

In the case of the automobile controller of the invention of claim 4, rewriting-signal generation means comprises an external unit storing a rewriting program and a rewrite-enable signal source for generating a rewrite-enable logic level signal in accordance with the rewriting program and a logic circuit for generating a signal for setting the mode-setting related terminal of a microcomputer to the rewriting mode in accordance with the rewrite-enable logic level signal generated by the external unit.

In the case of the automobile controller of the invention of claim 5, a nonvolatile memory is provided for the outside of a microcomputer through bus connection and the nonvolatile memory is rewritten by setting the microcomputer to the rewriting mode.

DETAILED DESCRIPTION OF THE PREFERRED EMBODIMENTS

Embodiment 1

Figure 1:
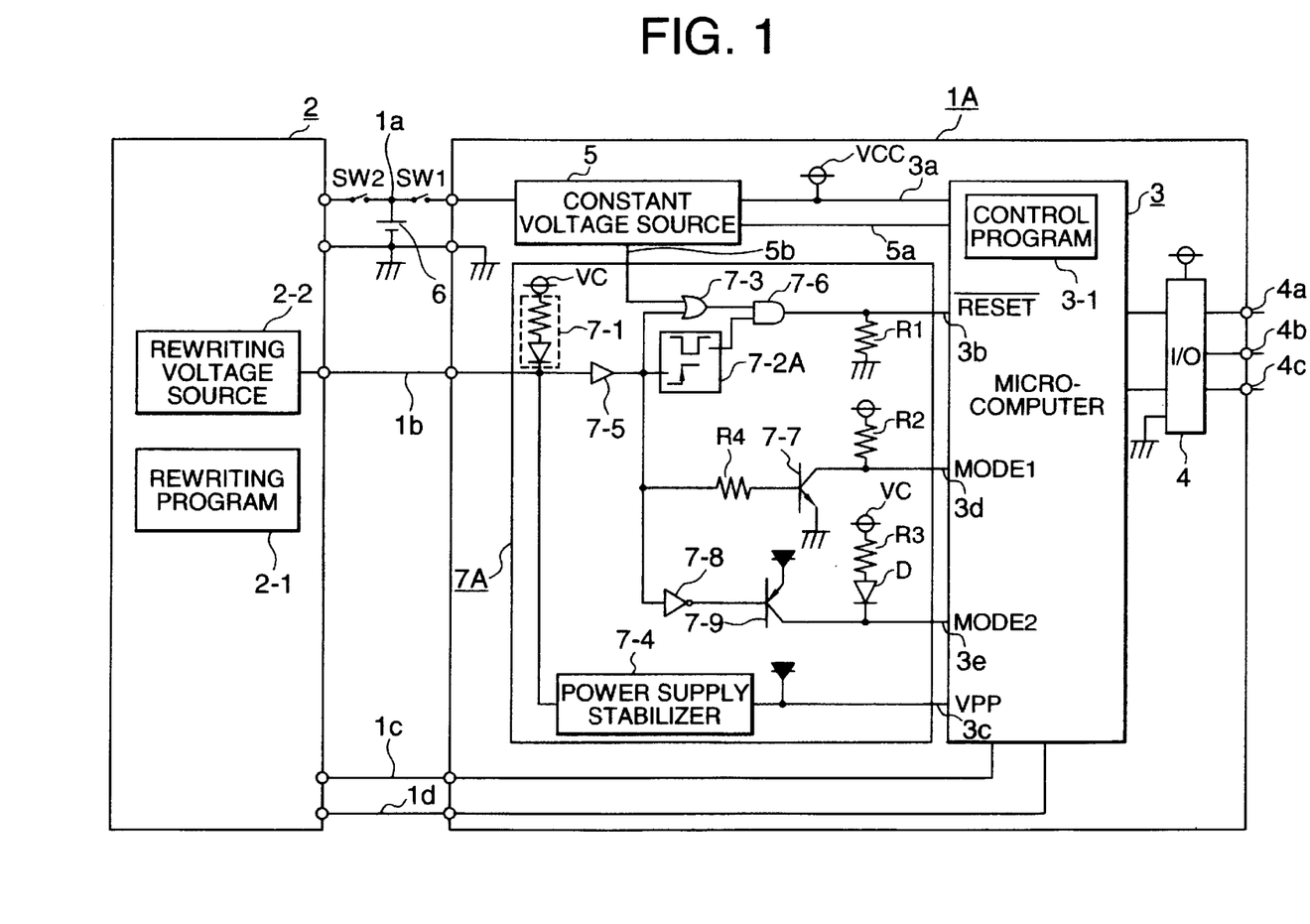
FIG. 1 is an embodiment 1 of the present invention showing an automobile controller and an external unit.

The automobile controller of embodiment 1 of the present invention is described below by referring to the accompanying drawings. FIG. 1 is a block diagram of the automobile controller of this embodiment. In FIG. 1, symbol 1A denotes a controller and 2 denotes an external unit storing a rewriting program 2-1 and a rewriting voltage source 2-2.

Symbol 3 denotes a microcomputer which stores an erasable nonvolatile memory 3-1 and a control program for performing various types of arithmetic processing is stored in the nonvolatile memory 3-1.

Symbol 4 denotes an I/O for capturing various types of input information and performing various types of output control. Symbol 5 denotes a constant voltage source for generating a control power-supply voltage VCC3$a$ of approx. 5 V for operating the microcomputer 3 and the I/O 4 from a battery power supply 6 to be supplied through a power supply input switch SW1.

Moreover, the constant voltage source 5 generates a reset signal 5$b$ for controlling the microcomputer 3 and the reset signal 5$b$ has a power-on reset control function for keeping the microcomputer 3 at a reset state for a predetermined time when the VCC3$a$ is input and a watchdog reset control function for regularly generating a reset signal when a watchdog pulse signal 5$a$ output from the microcomputer 3 is not detected at a proper interval.

Symbol 7A denotes a logic circuit which generates a setting voltage for a reset terminal 3$b$, MODE1 terminal 3$d$, MODE2 terminal 3$e$, and VPP terminal 3$c$ serving as mode-setting related terminals of the microcomputer 3 in accordance with a rewriting power supply 1$b$ supplied from the rewriting voltage source 2-2 and the reset signal 5$b$ supplied from the constant voltage source 5. A logic structure is constituted so that the rewriting mode is set when a rewriting power supply of approx. 12 V is applied to the rewriting power supply 1$b$ and the reading mode is set when no voltage is applied to the rewriting power supply 1$b$.

A power-supply stabilizer 7-4 removes noises from the rewriting power supply 1$b$ output from the rewriting voltage source 2-2 to smooth the power supply 1$b$ and supplies a rewriting voltage VPP (12 V) to the microcomputer 3.

Moreover, after the microcomputer 3 is set to the writing mode, erasing, rewriting, and collating instructions and data are transferred through serial communication lines 1$c$ and 1$d$.

In the case of the above structure, a crank angle signal 4$a$ for measuring an engine speed and an intake air quantity signal 4$b$ for measuring an air quantity taken into an engine are input to the I/O 4. The microcomputer 3 computes the amount of fuel to be injected into the engine in accordance with these input signals and outputs the controlled variable according to the arithmetic operation result as a fuel injection quantity signal 4$c$ through the I/O 4. The fuel injection control is described above which is a typical control of engine control. However, it is also possible to apply the fuel injection control to other automobile controller for transmission control.

Figure 2:
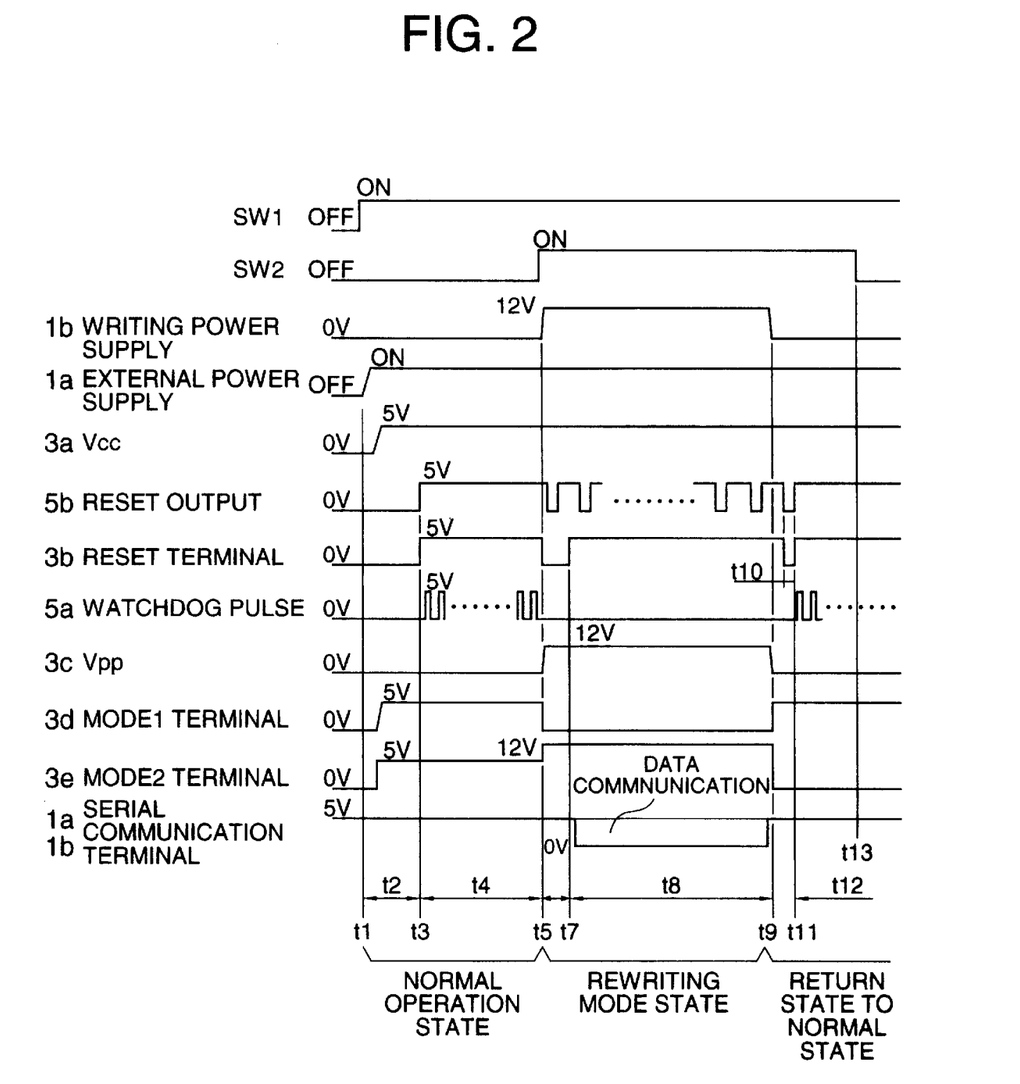
FIG. 2 is a timing chart showing the circuit operation timing in FIG. 1.

Then, the program rewriting operation of this embodiment is described below by referring to FIGS. 2 and 1. FIG. 2 is a timing chart for input/output of signals applied to each terminal for rewriting the nonvolatile memory 3-1 shown in FIG. 1.

FIG. 2 shows the following three typical operation states: the period between time t1 and time t4 shows the normal operation state in the reading mode after power supply input, the period between time t5 and time t9 shows the rewriting mode state under a state of applying the rewriting voltage source 1$b$, and the period between time t10 and time t13 shows the return state to the normal state after stopping applying the rewriting voltage source.

First, the normal operation state (between time t1 and time t4) is described.

An external power supply 1$a$ is supplied when a user turns on SW1 at the time t1 and the VCC3$a$ of approx. 5 V is supplied to the entire controller 1 from the constant voltage source 5 at the time t2. At the time t2, a logic circuit 7 constructs a logic for setting the nonvolatile memory 3-1 to the reading mode. In this case, each voltage is applied to each terminal through a buffer 7-1, inverter 7-8, and transistors 7-9 and 7-11 so that the MODE1 terminal 3$d$ shows 5 V, MODE2 terminal 3$e$ shows 5 V, and VPP terminal 3$c$ shows 0 V. However, the reset terminal 3$b$ is set to 0 V which is a reset voltage through an OR circuit 7-3 and an AND circuit 7-6 due to the power-on reset control by the constant voltage source 5. Therefore, the microcomputer 3 keeps a reset state.

The microcomputer 3 captures the states of the MODE1 terminal 3$d$, MODE2 terminal 3$e$, and VPP terminal 3$c$ at a reset cancel edge and determines the operation mode. Therefore, the reset output 5$b$ rises to 5 V (high) and the nonvolatile memory 3-1 is set to the reading mode when power-on reset is canceled at the time t3. At the time t4, the controller 1A performs arithmetic operations in accordance with a control program and becomes the normal operation state for outputting a controlled variable.

Moreover, because the control program normally operates at the time t4, the microcomputer 3 outputs the watchdog pulse signal 5$a$ every predetermined interval and a constant voltage source circuit 5 monitors whether the watchdog pulse signal 5$a$ is output at a proper interval.

Then, the writing mode state (between time t5 and time t9) is described below.

When a user turns on SW2 in order to rewrite the contents of the nonvolatile memory 3-1 at the time t5, a writing power supply 1$b$ of approx. 12 V is supplied to the logic circuit 7. In this case, when VCC3$a$ is set to 0 V and the writing power supply 1$b$ is supplied, the microcomputer 3 may be broken down. Therefore, by using means 7-1 for confirming the voltage of VCC, it is possible to confirm whether VCC3$a$ is present before applying the writing power supply 1$b$ by the external unit 2 and inhibit the writing power supply 1$b$ from being applied when VCC3$a$ is 0 V.

At the time t6, the voltage of each terminal is set by the logic circuit 7 so that the MODE1 terminal 3$d$ shows 0 V, MODE2 terminal 3$e$ shows 12 V, and VPP terminal 3$c$ shows 12 V as a logic for setting the nonvolatile memory 3-1 to the rewriting mode and moreover, a reset signal (0 V) is input to the reset terminal 3$b$ for a predetermined time by a one-shot circuit 7-2A, a reset cancel signal (5 V) is input to the reset terminal 3$b$ at the time t7 (edge to be reset-canceled), and the microcomputer 3 is set to the rewriting mode.

At the time t8, erasing and writing instructions and rewriting data for rewriting the nonvolatile memory 3-1 are transmitted from the external unit 2 through a serial communication line 1$c$ and a writing completion signal, error signal, and collation data are returned to the external unit 2 from the microcomputer 3 through a serial communication line 1$d$, and execution and completion of writing are confirmed.

Moreover, the microcomputer 3 is set to the rewriting mode between time t6 and time t8. In this case, because the control program stored in the nonvolatile memory 3-1 is not executed. Therefore, the watchdog signal 5$a$ stops and a periodic reset signal 5$b$ is output from the constant voltage source 5. However, because the reset signal 5$b$ is masked by the OR circuit 7-3 in the logic circuit 7, the microcomputer 3 is not reset and therefore, it is possible to maintain the rewriting mode.

Finally, the return state to the normal state (between time t9 and time t13) is described below. The external unit 2 confirms the normal end of rewriting through serial communication and then, stops supplying the writing power supply 1b at the time t9. Thereby, the voltage to be supplied to the MODE1 terminal 3d, MODE2 terminal 3e, and VPP terminal 3c is set to a voltage in the reading mode by the logic circuit 7 similarly to the case of the time t2. However, because there is no reset edge, the microcomputer 3 maintains the rewriting mode at the time t10 and therefore, a new control program written in the nonvolatile memory 3-1 cannot be executed.

However, because masking of the reset signal 5b is canceled by the OR circuit 7-3 at the time t9, the microcomputer 3 is reset-canceled at the time t11 by the periodic reset signal 5b continuously generated since the time t5 and changed to the reading mode to start control in accordance with the new control program written in the nonvolatile memory 3-1 at the time t12. A user confirms whether the nonvolatile memory 3-1 is normally rewritten and the normal operation is started and thereafter, turns off SW2 to complete the rewriting operation.

Embodiment 2

In the case of the embodiment 1, the power supply stabilizer 7-4 removes noises from the rewriting voltage source 1b of approx. 12 V to smooth the power supply 1b. However, a case is estimated in which it is difficult to set the rewriting voltage source to the specified power supply voltage of the microcomputer 3 due to a voltage drop by a harness or ground potential difference between the controller 1A and the external unit 2. In this case, it is also possible to set the rewriting voltage source 1b to approx. 16 V to regulate it to approx. 12 V within the specified value of the microcomputer 3 by the power supply stabilizer 7-4.

Thereby, it is possible to realize stable rewriting independently of the difference between vehicles or the state under rewriting.

Embodiment 3

In the case of the embodiment 2, the rewriting voltage source 1b is set to approx. 16 V. In the case of this embodiment, however, it is possible to set the rewriting voltage source 1b to approx. 5 V and boost the power supply 1b to approx. 12 V within the specified value of the microcomputer 3 by the power supply stabilizer 7-4.

Embodiment 4

Figure 3:
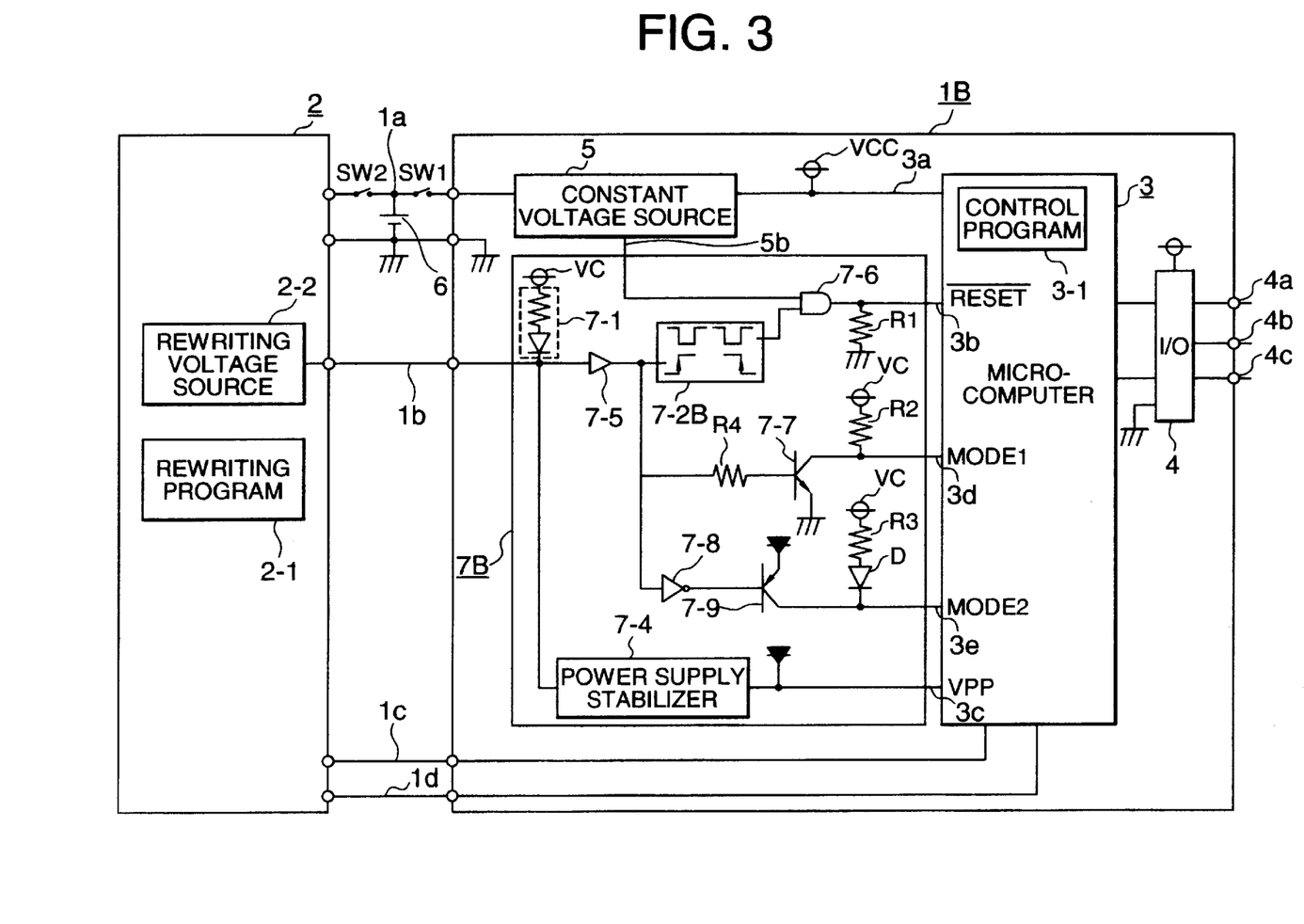
FIG. 3 is a block diagram showing an embodiment 4 of the present invention.

FIG. 3 is a block diagram of the automobile controller of the embodiment 4 of the present invention. In FIG. 3, a symbol same as that in FIG. 1 denotes the same or a corresponding portion.

In FIG. 3, symbol 1B denotes the controller of this embodiment. The controller 1B of this embodiment is constituted so as not to have the watchdog pulse 5a. Therefore, it is impossible to return to the normal state through periodic resetting at the time t10 in the timing chart shown in FIG. 2. However, it is possible to perform self-return to the reading mode after rewriting is completed by providing a function for generating a reset signal (0 V) for a predetermined time at the reset terminal 3b in accordance with the change of the rewriting voltage source 1b (time t5 and time t9) for a one-shot circuit 7-2B.

Embodiment 5

Figure 4:
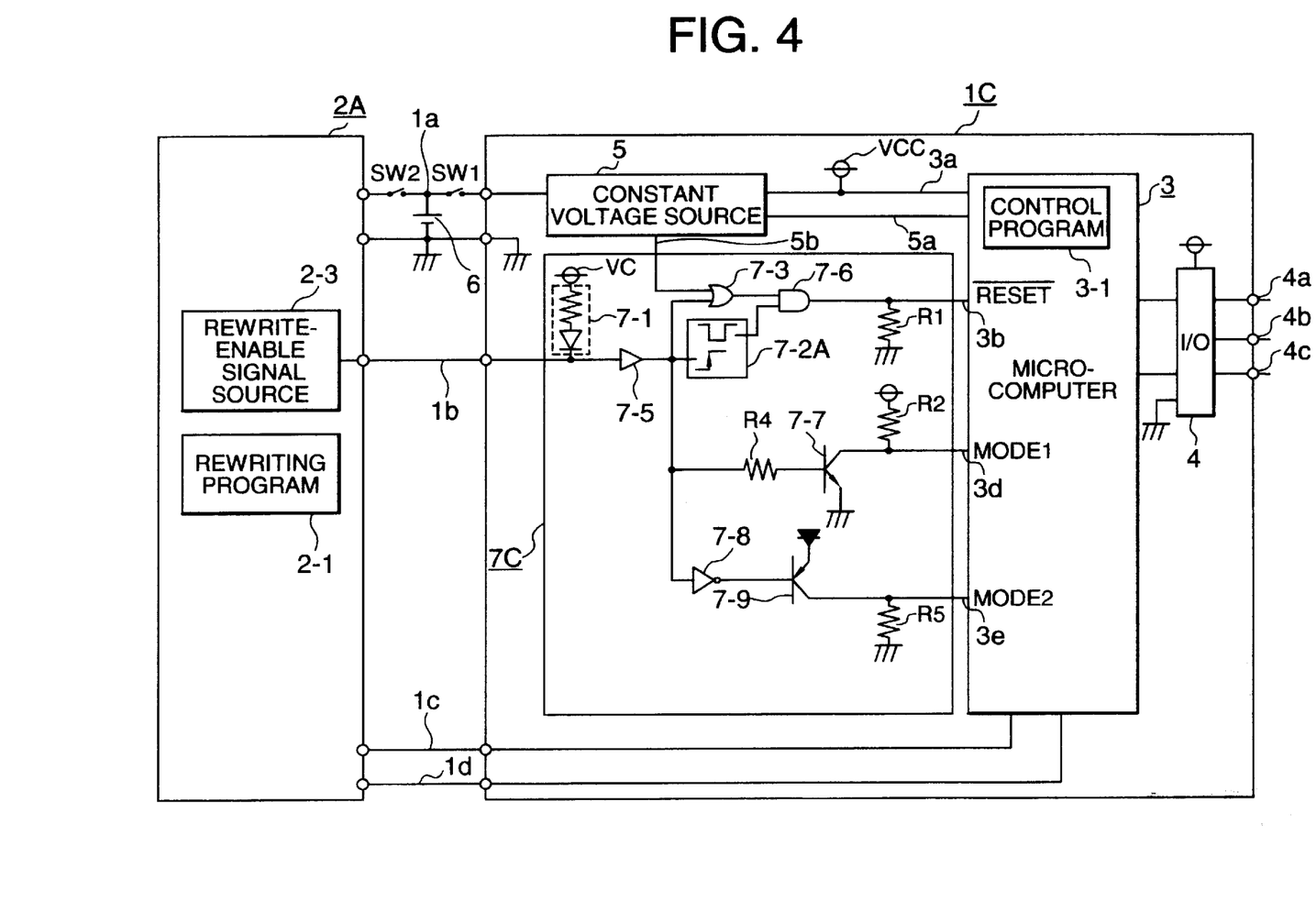
FIG. 4 is a block diagram showing an embodiment 5 of the present invention.

FIG. 4 is a block diagram of the automobile controller of the embodiment 5 of the present invention. In FIG. 4, a symbol same as that in FIG. 1 denotes the same or a corresponding portion. In FIG. 4, symbol 1C denotes the controller of this embodiment.

The controller 1C of this embodiment does not require a rewriting voltage VPP3c of approx. 12 V and it is characterized by using the microcomputer 3 which can be set to the rewriting mode only with VCC3a of approx. 5 V.

The controller 1C of this embodiment is provided with a logic circuit 7C for generating a mode-setting related signal of the microcomputer 3 from a logic-level rewrite-enable signal 1e to be supplied from the external unit 2A storing the rewrite-enable signal source 2-3.

Therefore, the set value of the MODE1 terminal 3d and that of the MODE2 terminal 3e in the timing chart shown in FIG. 2 are different from each other and the voltage of each terminal is set so that the MODE1 terminal 3d shows 0 V and the MODE2 terminal 3e shows 5 V under the rewriting mode. Moreover, the voltage of each terminal is set so that the MODE1 terminal 3d shows 5 V and the MODE2 terminal 3e shows 0 V under the normal mode. Thereby, even when a microcomputer requiring no rewriting voltage source is used, it is possible to perform rewriting similarly to the case of the embodiment 1 and moreover, it is possible to simplify the logic circuit 7C because the power supply stabilizer 7-4 is unnecessary.

Embodiment 6

Figure 5:
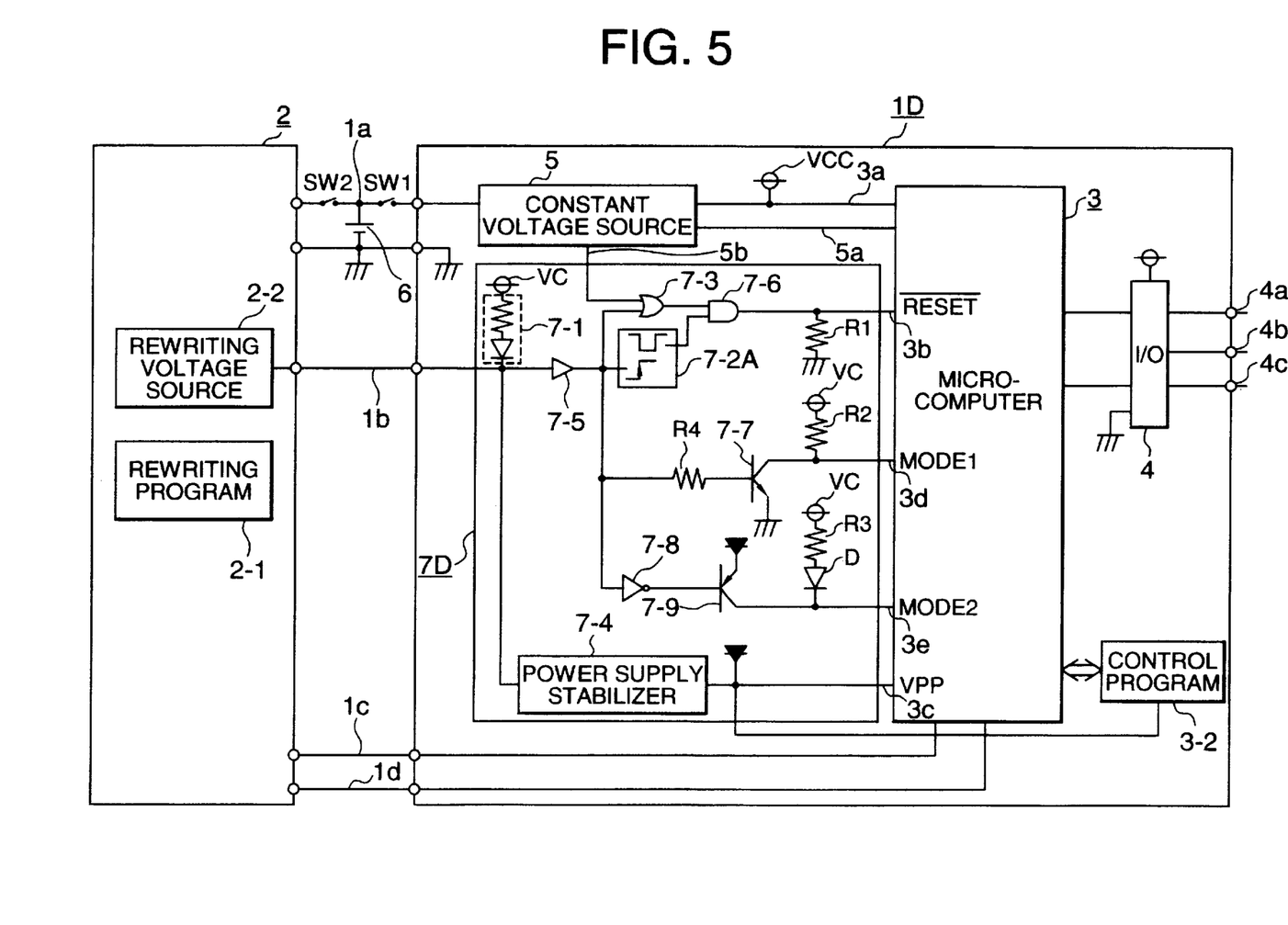
FIG. 5 is a block diagram showing an embodiment 6 of the present invention.

FIG. 5 is a block diagram of the automobile controller of the embodiment 6 of the present invention. In FIG. 5, a symbol same as that in FIG. 1 denotes the same or a corresponding portion. In FIG. 5, symbol 1D denotes the controller of this embodiment.

The controller 1D of this embodiment is characterized in that a nonvolatile memory 3-2 storing a control program is not built in the microcomputer 3 but it is set outside of the microcomputer 3 and connected by a bus 3f.

In this case, the microcomputer 3 and the nonvolatile memory 3-2 are connected each other by the bus 3f (address bus, data bus, control terminal, and clock terminal) and the external nonvolatile memory 3-2 is set to the writing mode by VPP3c sent from the logic circuit 7D and a bus signal sent from the microcomputer 3.

This embodiment has the same structure as the embodiment 1 except that the nonvolatile memory 3-1 is not built in the microcomputer 3 and its rewriting operation is the same as the operation shown by the timing chart in FIG. 2. Thereby, when the capacity of the nonvolatile memory 3-1 built in the microcomputer 3 is insufficient, it is possible to add the nonvolatile memory 3-2 to the outside of the microcomputer 3 and thereby, this embodiment can be applied to every controller.

What is claimed is:

1. An automobile controller comprising:
    a microcomputer for performing control processing by accessing electrically erasable nonvolatile memory storing a control program; and
    rewriting-signal generator for generating a signal for setting mode-setting related terminal of said microcomputer to a rewriting mode in accordance with a rewriting program stored in a built-in nonvolatile memory,
    wherein the rewriting-signal generator further comprises:
        external unit storing the rewriting program;
        a rewriting voltage source for generating the rewriting voltage in accordance with the rewriting program; and
        a logic circuit for generating a signal for setting the mode-setting related terminal of the microcomputer to the rewriting mode in accordance with the rewriting voltage generated by the external unit.

2. The automobile controller according to claim 1, wherein an input circuit of the rewriting voltage source is provided with voltage confirmation means for confirming power supply voltage of the microcomputer with the external unit.

3. An automobile controller comprising:

a microcomputer for performing control processing by accessing electrically erasable nonvolatile memory storing a control program; and rewriting-signal generator for generating a signal for setting mode-setting related terminal of said microcomputer to a rewriting mode in accordance with a rewriting program of a built-in nonvolatile memory, wherein the rewriting-signal further comprises:
- an external unit storing the rewriting program;
- a rewrite-enable signal source for generating a rewrite-enable logic level signal in accordance with the rewriting program; and
- a logic circuit for generating a signal for setting the mode-setting related terminal of the microcomputer to the rewriting mode in accordance with the rewrite-enable logic level signal generated by the external unit.

4. An automobile controller comprising:

a microcomputer for performing control processing by accessing electrically erasable nonvolatile memory storing a control program: and rewriting-signal generator for generating a signal for setting mode-setting related terminal of said microcomputer to a rewriting mode in accordance with a rewriting program of a built-in nonvolatile memory, wherein a nonvolatile memory is provided outside of the microcomputer and said nonvolatile memory is rewritten by setting said microcomputer to the rewriting mode, wherein said nonvolatile memory and said microcomputer are connected using a bus connection.

* * * * *